J. C. COOKE.
HOSE COUPLING.
No. 22,166.  Patented Nov. 30, 1858.
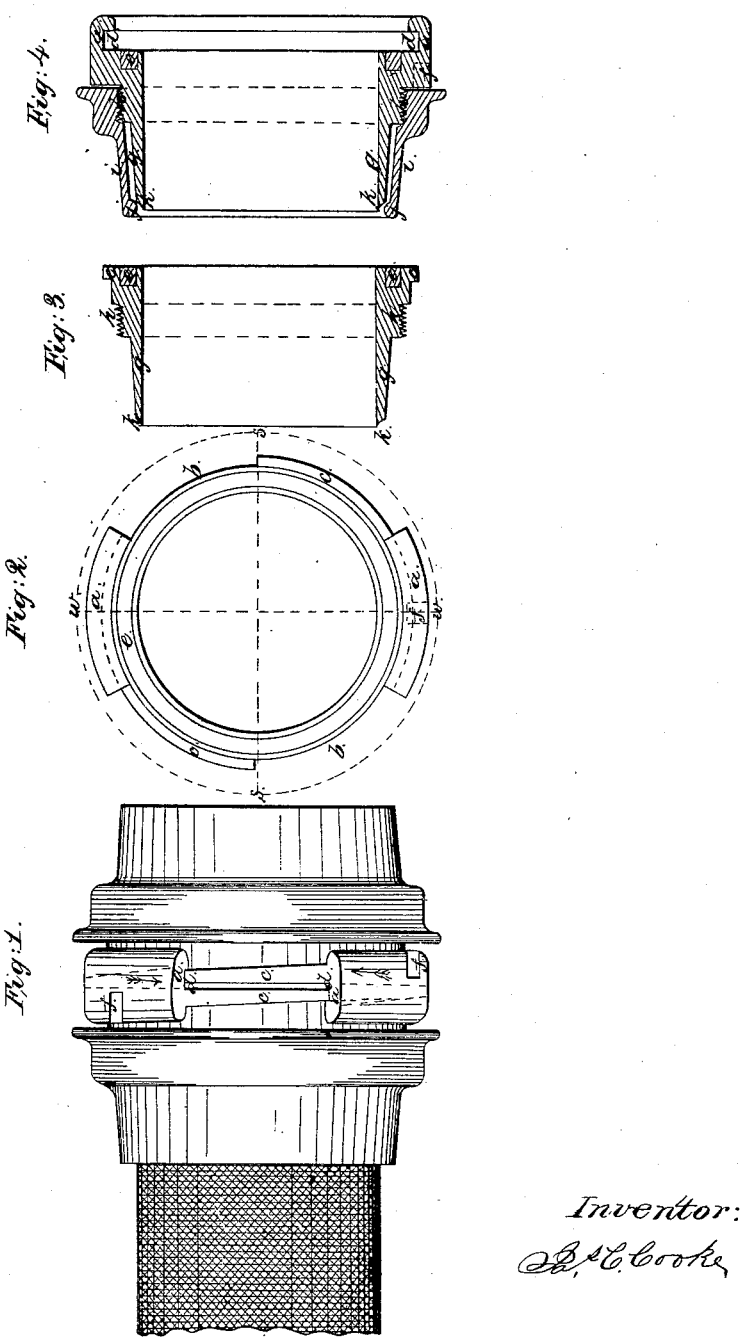
Witnesses:
Maria W Barnes
Jonathan Barnes
Inventor:
J. C. Cooke

UNITED STATES PATENT OFFICE.

JAMES C. COOKE, OF MIDDLETOWN, CONNECTICUT.

IMPROVED HOSE-COUPLING.

Specification forming part of Letters Patent No. 22,166, dated November 30, 1858.

*To all whom it may concern:*

Be it known that I, JAMES C. COOKE, of Middletown, in the county of Middlesex and State of Connecticut, have invented a new and Improved Coupling for Hose or other Like Purposes; and I do hereby declare that the following is a full, and exact description thereof, reference being had to the accompanying drawings, and to the letters of reference marked thereon, which make a part of this specification.

My invention consists in providing each part or half of the coupling with both male and female flanges or parts that interlock each other, arranged and applied in such a manner that either half of one coupling will readily match or unite with either half of any other coupling, and thus prevent the necessity of ever changing ends with the length of hose or other article upon which the coupling is placed or used, as is often the case with the ordinary coupling having one half provided with a male and the other half provided with a female part only.

My invention further consists in providing my coupling with a tapered part upon which the hose is to be fastened, the end being beveled, and with a tapering ring or band screwed or otherwise fastened to the coupling, which ring or band is made large enough to admit and at the same time hold firmly when in its proper place the thickness of the hose between its inner surface and the outer surface of the tapered part of the coupling, which band is further provided with a rim or projection upon its inner side and at or near the end, which shall press the hose against the beveled part of the coupling, at the same time bringing the inner surfaces of the hose and coupling on or nearly on a line with each other.

Figure 1 is a side elevation showing the parts together and placed ready to be locked, and with the hose attached to one-half. Fig. 2 is a plan or end view showing the form and position of the flanges or male and female locking parts and the packing. Fig. 3 is a section of one-half of the coupling without the band cut through at $s\ s$, Fig. 2, showing the male locking parts, packing, tapered and beveled parts, &c. Fig. 4 is a section of one-half of the coupling and band cut through at $w\ w$, Fig. 2, and showing the female locking parts, packing, tapered and beveled parts of the coupling, space for the hose, the rim or projection upon the band, &c.

I make my coupling of any suitable material, leaving the inside straight, or nearly so, as seen in Figs. 3 and 4. Upon one end of each half I make one or more female parts, as at $a\ a$, Figs. 1, 2, and 4. These female parts $a\ a$ are so constructed and arranged upon the end of each half of the coupling that in placing the two halves of the coupling together the female parts $a\ a$ of each half pass into the space $b$ (seen in Fig. 2) between a corresponding female part $a$ and the male part $c$ upon another half. These female parts $a\ a$ project beyond the face of the coupling, as will be seen in Figs. 1 and 4. I also place upon the same end with the female parts $a\ a$ a corresponding number of male parts $c\ c$, Figs. 1, 2, and 3. These male parts $c\ c$ are so arranged and placed that when the two halves of the coupling are placed together, as before described and seen in Fig. 1, the male part $c$ upon one half of the coupling comes opposite a corresponding male part $c$, and upon a line with the groove $d$ of the female part $a$ of the other half, as seen in Fig. 1. Then by turning the halves of the coupling in opposite directions, as shown by the arrows in Fig. 1, the male parts $c\ c$ of each half enter the grooves $d\ d$ of the female parts $a\ a$ of the other half of the coupling. These male parts $c\ c$ and the grooves $d\ d$ I make tapering upon one side and to correspond with each other, as seen in Fig. 1, (the taper of the grooves being shown by dotted line,) so that in turning the two halves together, as before described, the two halves shall bind together and make a substantial joint, and when necessary I place in the face of each half a ring of packing of leather or other suitable material, as seen at $e$, Figs. 2, 3, and 4.

The indentations $f\ f$ are for the purpose of applying a wrench, and may be made either in that form, or projections may be placed in their stead, as may be thought best or desired.

I make the other end of my coupling tapering for a suitable distance, as seen at $g\ g$, Figs. 3 and 4, and beyond the tapering part I place a screw $h$. Then by placing the hose upon this tapering part and passing the tapering ring or band $i$ over the hose it will be apparent that as the band $i$ is screwed onto the coupling the tapering surfaces of the coupling and band will be drawn nearer together, thus leaving (when the band is turned to its place, as seen in Fig. 4) only space enough between them for the hose, and at the same time the projection $j$ upon the band $i$ is made to press the hose firmly upon the beveled part $k$ of the coupling, thus holding the hose securely in its place, and at the same time bringing the inner surfaces of the hose and coupling upon a line, or nearly so.

I do not claim flanges or locking parts having one half of the coupling provided with a male and the other half a female part, as I am aware that such is not new. Neither do I claim, broadly, making both halves of my coupling alike; but

What I claim as my invention, and desire to secure by Letters Patent, is—

The female parts $a\ a$, in combination with the male parts $c\ c$, arranged and made to operate substantially for the purpose herein specified.

Dated at Middletown the 9th day of October, A. D. 1858.

JAS. C. COOKE.

In presence of—
MARIA W. BARNES,
JONATHAN BARNES.